United States Patent Office 3,299,114
Patented Jan. 17, 1967

3,299,114
PROCESS FOR MAKING CHLOROFORMATES WITH AMINES AS CATALYSTS
Harry Tilles, El Cerrito, Calif., assignor to Stauffer Chemical Company, New York, N.Y., a corporation of Delaware
No Drawing. Filed June 10, 1965, Ser. No. 463,005
1 Claim. (Cl. 260—455)

This application is a continuation-in-part of my co-pending application Serial Number 218,161, filed August 20, 1962, now abandoned.

This invention relates in general to an improved method for the preparation of chlorothiolformates.

Various methods are known for the preparation of lower alkyl and phenyl chlorothiolformates, but each of these afford only relatively low yields and impure products. Further, certain known methods require a number of days for completion, require refrigerated cooling and large volumes of reaction mixture, do not afford uniform results (exhibiting sensitivity to reaction conditions), or require the preparation of lead mercaptides.

The present inventor's U.S. Patent No. 3,093,537 discloses the use of activated carbon as a selective catalyst for the following reaction:

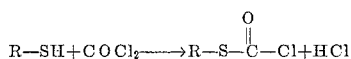

Generally, the present invention relates to the process wherein a mixture of the appropriate mercaptan and phosgene are reacted in the presence of a tertiary amine or a nitrogen-containing heterocyclic compound which act as catalysts for the reaction:

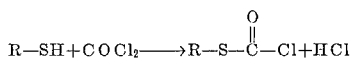

wherein R is alkyl, cycloalkyl, lower alkenyl, aryl, alkaryl, aralkyl, haloaryl, haloarylalkyl, and carboalkoxyalkyl.

As examples of organic mercaptans which can be suitably used in the reaction of the present invention are alkyl mercaptans such as methylmercaptan, ethylmercaptan, isopropylmercaptan, n-propylmercaptan, isobutylmercaptan, n-butylmercaptan, 2-pentylmercaptan, isoamylmercaptan, n-amylmercaptan, and the like. As examples of cycloalkyl mercaptans the following may be employed: cyclopentylmercaptan, cyclohexylmercaptan, 2-methylcyclohexyl mercaptan, 3-methylcyclohexyl mercaptan, and the like. Allyl mercaptan and butenyl mercaptan are typical examples of lower alkenyl mercaptans that can be used in the above defined reaction. Equally operable are aryl, alkaryl, aralkyl, haloaryl and haloaralkyl compounds exemplified by the following compounds: mercaptobenzene, 2-mercaptonaphthalene, p-mercaptotoluene, o-mercaptotoluene, m-mercaptotoluene, 3,4-dimercaptotoluene, 2,4-dimethylmercaptobenzene, 2,5-dimethylmercaptobenzene, p - tert - butylmercaptobenzene, 1-methyl-2-mercaptonaphthalene, 4-ethyl-mercaptobenzene, benzylmercaptan, mercaptoethyl benzene, mercaptopropyl benzene, triphenylmethyl mercaptan, mercaptomethyl naphthalene, mercaptoethyl naphthalene, mercaptobutylnaphthalene, o-chloromercaptobenzene, m-chloromercaptobenzene, p-chloromercaptobenzene, 2,5-dichloromercaptobenzene, p-bromomercaptobenzene, o-iodomercaptobenzene, m-iodomercaptobenzene, p-iodomercaptobenzene, o-chlorobenzyl mercaptan, m-chlorobenzyl mercaptan, p-chlorobenzyl mercaptan, 2,4-dichlorobenzyl mercaptan, 3,4-dichlorobenzyl mercaptan, p-bromobenzyl mercaptan, 4-chloro-1-mercaptonaphthalene, 4-bromo-1-mercaptonaphthalene, and the like. Similarly, examples of carboalkoxy-alkyl mercaptans that can be reacted with phosgene according to the present invention are those compounds typified as esters of mercapto-acids. Suitable examples are methyl mercaptoacetate, ethyl mercaptoacetate, propyl mercaptoacetate, butyl mercaptoacetate, pentyl mercaptoacetate, hexyl mercaptoacetate, methyl α-mercaptopropionate, ethyl α-mercaptopropionate, pentyl α-mercaptopropionate, methyl β-mercaptopropionate, ethyl β-mercaptopropionate, hexyl β-mercaptopropionate, methyl α-mercaptobutyrate, propyl α-mercaptobutyrate, hexyl α-mercaptobutyrate, methyl β-mercaptobutyrate, ethyl β-mercaptobutyrate, hexyl β-mercaptobutyrate, methyl γ-mercaptobutyrate, ethyl γ-mercaptobutyrate, hexyl γ-mercaptobutyrate, methyl β-mercaptovalerate, ethyl β-mercaptovalerate, hexyl β-mercaptovalerate, methyl δ-mercaptovalerate, ethyl δ-mercaptovalerate, hexyl δ-mercaptovalerate, and the like.

The catalysts of the present invention are equally useful in the reaction of phosgene and a dithiol and the selectivity of the catalysts is equally effective as activated carbon, both of which are described in detail in the inventor's previously mentioned patent.

The following synthetic methods were used in carrying out the present invention and the tables following give the results of such runs.

SYNTHETIC METHOD A

A 500 cc. 4-neck flask was provided with stirrer, thermometer, gas inlet tube and Dry Ice condenser. The mercaptan and catalyst were charged and then an excess of phosgene was passed in, maintaining the temperature between 20–30° C. with cooling. The time of addition varied between 15 minutes to an hour. After the addition was completed, the reaction mixture was allowed to stir for several hours without any external cooling but the Dry Ice condenser was kept full. Most of the excess phosgene was then stripped out with air at a temperature of 20–30° C. The reaction mixture was washed with 2–100 cc. portions of 4.5% hydrochloric acid and 2–100 cc. portions of water.

After washing, the reaction product was dried over a small amount of anhydrous magnesium sulfate, filtered, and the filtrate was brought to reflux under water pump vacuum in order to remove the volatile impurities. The cooling water in the reflux condenser was maintained at such a temperature that the chlorothiolformate would condense, but the mercaptan would not condense. After the distilland temperature had remained constant for ten minutes, the refluxing was stopped, the yield was obtained and the refractive index of the product was taken.

SYNTHETIC METHOD B

This method was the same as A except that the reaction mixture was diluted with 100–200 cc. of n-pentane before washing. After the washing was completed, and the mixture was dried over anhydrous magnesium sulfate, the n-pentane was removed on the steam bath. This always resulted in some loss by evaporation of the lower alkyl chlorothiolformates. It was then brought to reflux under water pump vacuum.

SYNTHETIC METHOD C

This method was the same as B except that the product was vacuum distilled after refluxing under vacuum in order to separate it from high boiling impurities.

Table $R_1SH + COCl_2 \longrightarrow R_1S-COCl + HCl$

TERTIARY AMINE CATALYST $(R_2)(R_3)(R_4)N$

| $R_1$ | Moles of $R_1SH$ | Moles of $COCl_2$ | Moles of Catalyst | Synthesis Method | Yield of Chlorothiolformate | $n_D^{30}$ of Chlorothiolformate | $R_2$ | $R_3$ | $R_4$ |
|---|---|---|---|---|---|---|---|---|---|
| $C_2H_5$ | 1.00 | 1.20 | 0.05 | A | 82 | 1.4780 | $C_2H_5$ | $C_2H_5$ | $C_2H_5$ |
| $n\text{-}C_3H_7$ | 1.00 | 1.20 | 0.05 | B | 78 | 1.4755 | $C_2H_5$ | $C_2H_5$ | $C_2H_5$ |
| $i\text{-}C_3H_7$ | 1.00 | 1.20 | 0.05 | A | 63 | 1.4688 | $C_2H_5$ | $C_2H_5$ | $C_2H_5$ |
| $n\text{-}C_4H_9$ | 1.00 | 1.22 | 0.05 | A | 89 | 1.4747 | $C_2H_5$ | $C_2H_5$ | $C_2H_5$ |
| $t\text{-}C_4H_9$ | 1.00 | 1.22 | 0.05 | A | 48 | 1.4699 | $C_2H_5$ | $C_2H_5$ | $C_2H_5$ |
| $n\text{-}C_8H_{17}$ | 1.00 | 1.20 | 0.05 | B | 88 | 1.4723 | $C_2H_5$ | $C_2H_5$ | $C_2H_5$ |
| Phenyl | 1.00 | 1.20 | 0.05 | C | 72 | 1.5786 | $C_2H_5$ | $C_2H_5$ | $C_2H_5$ |
| $n\text{-}C_3H_7$ | 1.00 | 1.30 | 0.04 | A | 85 | 1.4753 | Phenyl | $CH_3$ | $CH_3$ |
| $n\text{-}C_3H_7$ | 1.00 | 1.30 | 0.03 | A | 87 | 1.4750 | Phenyl | $C_2H_5$ | $C_2H_5$ |
| $n\text{-}C_3H_7$ | 1.00 | 1.22 | 0.02 | B | 74 | 1.4756 | $n\text{-}C_6H_{13}$ | $n\text{-}C_6H_{13}$ | $n\text{-}C_6H_{13}$ |
| $n\text{-}C_3H_7$ | 1.00 | 1.20 | 0.04 | A | 86 | 1.4755 | $C_2H_5$ | $-CH_2CH_2CH_2CH_2CH_2-$ | |
| $n\text{-}C_3H_7$ | 1.00 | 1.23 | 0.01 | B | 83 | 1.4756 | $n\text{-}C_8H_{17}$ | $n\text{-}C_8H_{17}$ | $n\text{-}C_8H_{17}$ |

Table $R_1SH + COCl_2 \longrightarrow R_1S-COCl + HCl$

HETEROCYCLIC BASIC NITROGEN COMPOUND CATALYSTS

| $R_1$ | Moles of $R_1SH$ | Moles of $COCl_2$ | Moles of Catalyst | Synthesis Method | Yield of Chlorothiolformate | $n_D^{30}$ of Chlorothiolformate | Catalyst | Structure |
|---|---|---|---|---|---|---|---|---|
| $C_2H_5$ | 1.00 | 1.20 | 0.06 | A | 82 | 1.4774 | Pyridine |  |
| $n\text{-}C_3H_7$ | 1.00 | 1.20 | 0.06 | A | 84 | 1.4745 | Pyridine |  |
| $i\text{-}C_3H_7$ | 1.00 | 1.20 | 0.06 | A | 63 | 1.4688 | Pyridine |  |
| $n\text{-}C_4H_9$ | 1.00 | 1.22 | 0.06 | A | 89 | 1.4740 | Pyridine |  |
| $t\text{-}C_4H_9$ | 1.00 | 1.22 | 0.06 | A | 18 | 1.4696 | Pyridine |  |
| $n\text{-}C_8H_{17}$ | 1.00 | 1.20 | 0.06 | B | 75 | 1.4727 | Pyridine |  |
| Phenyl | 1.00 | 1.20 | 0.06 | C | 75 | 1.5787 | Pyridine |  |
| $n\text{-}C_3H_7$ | 1.00 | 1.20 | 0.04 | A | 88 | 1.4748 | Quinoline |  |
| $n\text{-}C_3H_7$ | 1.00 | 1.20 | 0.04 | A | 86 | 1.4753 | Isoquinoline |  |
| $n\text{-}C_3H_7$ | 1.00 | 1.20 | 0.05 | A | 76 | 1.4752 | 2-methylpyrazine |  |
| $n\text{-}C_3H_7$ | 1.00 | 1.20 | 0.07 | B | 56 | 1.4758 | Pyrrole |  |
| $n\text{-}C_3H_7$ | 1.00 | 1.20 | 0.05 | A | 80 | 1.4750 | 3-picoline |  |

Table—Continued $R_1SH + COCl_2 \longrightarrow R_1S\text{—}COCl + HCl$

HETEROCYCLIC BASIC NITROGEN COMPOUND CATALYSTS

| $R_1$ | Moles of $R_1SH$ | Moles of $COCl_2$ | Moles of Catalyst | Synthesis Method | Yield of Chlorothiol-formate | $nD_{30}$ of Chlorothiol-formate | Catalyst | Structure |
|---|---|---|---|---|---|---|---|---|
| n-$C_3H_7$ | 1.00 | 1.20 | 0.04 | A | 86 | 1.4751 | 2,4,6-trimethylpyridine | |
| n-$C_3H_7$ | 1.00 | 1.20 | 0.05 | A | 88 | 1.4746 | 2,4-lutidine | |
| n-$C_3H_7$ | 1.00 | 1.20 | 0.04 | B | 74 | 1.4751 | 5-ethyl-2-methyl-pyridine | |
| n-$C_3H_7$ | 1.00 | 1.26 | 0.05 | C | 78 | 1.4750 | 4-ethylpyridine | |
| n-$C_3H_7$ | 1.00 | 1.20 | 0.04 | A | 85 | 1.4759 | 2-chloro-4,6-dimethyl-pyrimidine | |

In carrying out the process of the present invention, it is advisable that the reaction temperatures be maintained as low as possible, consonant with reasonable reaction rates. As is known, the mercaptans exhibit varying reactivities and this must be taken into account in selecting optimum reaction temperatures.

The process of the present invention is applicable with any ratio of reactants but economics dictate that approximately stoichiometric quantities be employed or, as is the preferred embodiment, a slight excess of phosgene be used.

Therefore, in order to catalyze the process of the present invention any nitrogen containing compound selected from the group consisting of (1) tertiary amines of the formula $$R_2\text{—}\underset{\underset{R_4}{|}}{\overset{\overset{R_3}{|}}{N}}$$

wherein $R_2$, $R_3$ and $R_4$ individually are selected from the group consisting of alkyl and phenyl, or when $R_2$ is alkyl or phenyl $R_3$ and $R_4$ jointly are a divalent alkylene radical of 4 to 6 carbon atoms, inclusive, and (2) heterocyclic amine compounds selected from the group consisting of pyridines, quinolines, isoquinolines, pyrazines, pyrolles and pyrimidines may be employed.

I claim:

A method for preparing chlorothiolformates comprising reacting a compound selected from the class consisting of alkyl mercaptans, cycloalkyl mercaptans, lower alkenyl mercaptans, aryl mercaptans, alkaryl mercaptans, aralkyl mercaptans, haloaryl mercaptans, haloaralkyl mercaptans and carboalkoxyalkyl mercaptans with phosgene in the presence of a catalytic amount of a nitrogen containing compound selected from the group consisting of (1) tertiary amines of the formula $$R_2\text{—}\underset{\underset{R_4}{|}}{\overset{\overset{R_3}{|}}{N}}$$

wherein $R_2$, $R_3$ and $R_4$ individually are selected from the group consisting of alkyl and phenyl, or when $R_2$ is alkyl or phenyl $R_3$ and $R_4$ jointly are a divalent alkylene radical of 4 to 6 carbon atoms, inclusive; and (2) heterocyclic amine compounds selected from the group consisting of pyridines, quinolines, isoquinolines, pyrazines, pyrolles and pyrimidines.

References Cited by the Examiner

UNITED STATES PATENTS 2,370,567  2/1945  Muskat et al. _____ 260—463

FOREIGN PATENTS 860,063  12/1952  Germany.

OTHER REFERENCES

Reimschneider et al.: Monatschefte für Chemie, 1953, vol. 84, pp. 518–521.

CHARLES B. PARKER, *Primary Examiner.*

D. R. MAHANAND, *Assistant Examiner.*